United States Patent
Maeda

(10) Patent No.: US 6,431,529 B1
(45) Date of Patent: Aug. 13, 2002

(54) DIAPHRAGM FOR AIR SPRING

(75) Inventor: Hiroyuki Maeda, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/599,414

(22) Filed: Jun. 22, 2000

(30) Foreign Application Priority Data

Jun. 29, 1999 (JP) .......................................... 11-183088

(51) Int. Cl.⁷ ................................................. F16F 9/04
(52) U.S. Cl. .................................................. 267/64.24
(58) Field of Search .......................... 267/64.21–64.27, 267/64.19, 122, 256, 31, 35; 280/711, DIG. 1; 92/96, 98 R, 98 D, 103 F

(56) References Cited

U.S. PATENT DOCUMENTS

| 4,022,448 | A | * | 5/1977 | Reeder | |
| 4,911,416 | A | * | 3/1990 | Warmuth | 267/64.24 |
| 5,954,316 | A | * | 9/1999 | Voss | 267/64.27 |

* cited by examiner

Primary Examiner—Christopher P. Schwartz
Assistant Examiner—C. T. Bartz
(74) Attorney, Agent, or Firm—Sughrue Mion, PLLC

(57) ABSTRACT

A diaphragm for air spring comprises an outer sleeve provided with a hollow cylindrical body, an inner sleeve and a folded diaphragm connecting the outer sleeve and the inner sleeve to each other, wherein an inner diameter of the diaphragm before the assembling at a region engaged with at least an inner sleeve of the air spring is made equal to or smaller than a minimum outer diameter of the inner sleeve.

7 Claims, 6 Drawing Sheets

Ib-Ib section

VIb-VIb section

DIAPHRAGM FOR AIR SPRING

BACKGROUND OF THE INVENTION

1. Field of the Invention

This invention relates to a diaphragm as a constructional member for an air spring used in vehicles and various industrial equipment, and more particularly to an improvement of the diaphragm for avoiding the degradation of performances in the air spring.

2. Description of Related Art

The air spring is widely used in large-size buses and trucks at the present because it is possible to fixedly hold a vehicle posture against a load change from curb weight to authorized payload or the like by controlling the supply of air from exterior and the discharge of air to the exterior and also spring constant can be set to a low level to improve the ride comfort and prevent the damage of freight.

As a typical example of the air spring, there is a diaphragm type air spring, which is usual to have a structure as shown in FIGS. 6a and 6b. That is, the air spring comprises an outer sleeve 8 having an air supply and discharge port 8a and an inner sleeve 9 fitting into an opening portion of the outer sleeve 8 and a two-folded diaphragm 10 connecting the outer sleeve 8 to the inner sleeve 9 to form an air chamber A therebetween.

In the air spring having the above structure, when vibration is input from the side of the inner sleeve 9 (piston) to change the inner sleeve 9 from an ordinary state of FIG. 7a to a state of moving in a compression stroke direction as shown in FIG. 7b (at the compression stroke, the pressure inside the air chamber A becomes high and the spring constant becomes high), the diaphragm 10 changes as follows. That is, when the inner sleeve 9 moves in a compression direction, the diaphragm 10 fixed to the inner sleeve also moves in the compression direction together with the inner sleeve 9. In this case, the diaphragm 10 is pulled into an inside of the outer sleeve 8 without increasing so the size thereof. The diaphragm 10 is provided in its inside with two cord reinforcing layers, cords 11a, 11b (nylon cord, polyester cord or the like) of which layers being crossed with each other as shown in FIG. 8, so that the cross cord angle in these reinforcing cord layers varies in the movement of the diaphragm 10 or these cords conduct so-called pantograph movement, whereby it is possible to smoothly change the shape of the diaphragm without creating wrinkles or the like.

In this type of the air spring, a hollow cylindrical body for suppressing expansion of diaphragm in the input of vibrations has recently been attached to the outer sleeve at the outside of the diaphragm in order to compact the volume of the air spring in a radial direction thereof (for space saving).

The arrangement of such a hollow cylindrical body is effective for the space-saving and can ensure the durability of the air spring even if the service pressure is increased. And also, since the durability can be ensured, the number of the cord reinforcing layers in the diaphragm can be decreased from 2 layers usually used to 1 layer. However, the use of the hollow cylindrical body newly causes the following problem. Accordingly, it is strongly demanded to solve this problem.

When the number of the cord reinforcing layers in the diaphragm is decreased from 2 to 1, it is required to arrange the cords constituting the cord reinforcing layer in a direction along an axial direction of the diaphragm before the attachment to the sleeves from a viewpoint of the balance when air is enclosed in the air spring. However, if it is intended to expand the diaphragm by inputting vibration to the air spring, since the size of the diaphragm can not be changed by the pantograph movement of the cords constituting the reinforcing layer, the size deformation is caused by stretching the elastomer (rubber) between the cords to enlarge the pitch of the cord, while if the diaphragm is contracted (size reduction), a force contracting from the produced size is acted to compress rubber between the cords and also air pressure is applied to the inside of the diaphragm, whereby a folding wrinkle is formed in the diaphragm. As a result, there is a problem that the durable life of the diaphragm is considerably degraded due to the repetitive formation of such a wrinkle.

SUMMARY OF THE INVENTION

It is, therefore, an object of the invention to provide a novel diaphragm capable of solving the above problem of the conventional technique in the air spring provided with the hollow cylindrical body for suppressing the expansion due to the input of vibration.

According to the invention, there is the provision of a diaphragm for air spring comprising an outer sleeve provided with a hollow cylindrical body suppressing an expansion of a diaphragm at a stroke in compression direction of the air spring and an air supply and discharge port, an inner sleeve fitted into an inside of the outer sleeve and a folded diaphragm connecting the outer sleeve and the inner sleeve to each other to from an air chamber, characterized in that an inner diameter of the diaphragm before the assembling at a region engaged with at least an inner sleeve of the air spring is made equal to or smaller than a minimum outer diameter of the inner sleeve so as to act tensile force in a circumferential direction of the diaphragm at a state of engaging with the inner sleeve.

In the invention, the region of the diaphragm engaging with the inner sleeve is a region maintaining the contact between the inner sleeve and the diaphragm at a maximum stroke in the compression direction of the air spring. And also, the diaphragm is a columnar shape wherein the inner diameter is equal over its full length, or a tapered shape wherein the inner diameter becomes gradually small from a position engaging with the outer sleeve toward a position engaging with the inner sleeve. Further, the diaphragm is provided with a cord reinforcing layer containing cords substantially arranged along an axial direction of the diaphragm.

According to the invention, the inner diameter of the diaphragm before the assembling at the region engaged with at least the inner sleeve of the air spring is made smaller than the outer diameter of the inner sleeve, so that when the diaphragm is assembled onto the inner sleeve, tensile force is acted to the engaged position in the circumferential direction of the diaphragm and hence the compression force created in the contraction of the diaphragm is mitigated by the tensile force and the initial properties of the diaphragm are maintained over a long period of time.

BRIEF DESCRIPTION OF THE DRAWINGS

The invention will be described with reference to the accompanying drawings, wherein:

FIG. 1b is a section view taken along a line Ib—Ib of FIG. 1a;

FIG. 2 is a diagrammatically plan view of the diaphragm shown in FIG. 1a;

FIG. 6b is a section view taken along a line VIb—VIb of FIG. 6a;

DESCRIPTION OF PREFERRED EMBODIMENTS

Figure 1A:
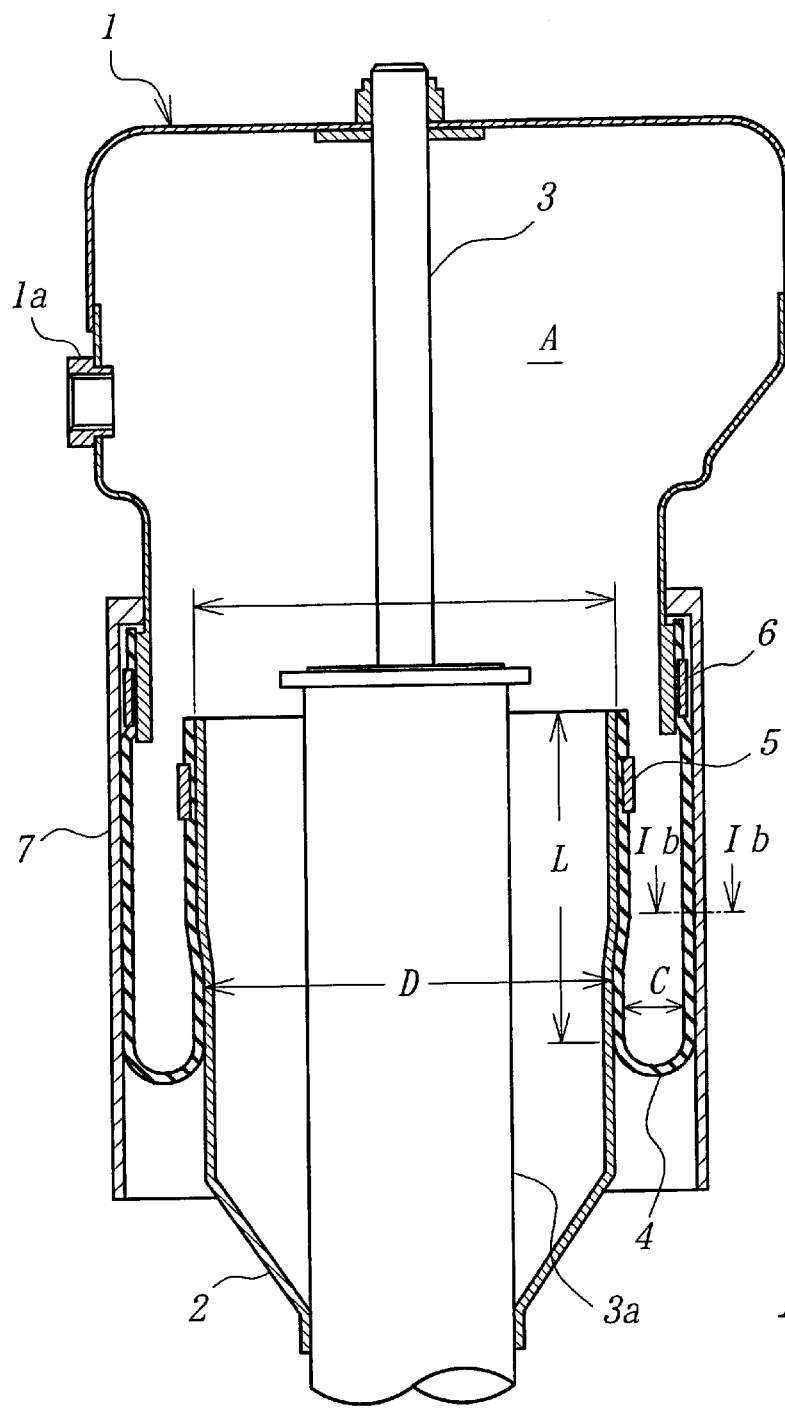
FIG. 1a is a diagrammatically section view of an air spring provided with an embodiment of the diaphragm according to the invention.
Figure 1B:
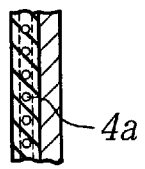

In FIGS. 1a and 1b is shown a sectional structure of an air spring provided with an embodiment of the diaphragm according to the invention. Numeral 1 is an outer sleeve having an opening at its one end and an air supply and discharge port 1a at its sidewall. Numeral 2 is an inner sleeve (piston) fitted into the opening of the outer sleeve 1 and fixed at its one end portion to a cylinder 3a concentrically arranged therein, and numeral 3 is a rod concentrically arranged in the cylinder 3a and fixed at one end to the outer sleeve 1. This rod 3 serves as a guide for guiding the movement of the inner sleeve 2 along the axial direction of the rod when vibration is input to the air spring to move the inner sleeve 2 in up-and-down directions but also acts as an oil damper mainly damping vibration together with the cylinder 3a. For this end, oil (not shown) is enclosed in the inside of the cylinder 3a and vibrations are damped by piston movement of a damping valve (not shown) attached to the other end of the rod 3. Numeral 4 is a diaphragm provided in its inside with one cord reinforcing layer and made of, for example, rubber connecting the outer sleeve 1 and the inner sleeve 2 to each other at a folded state, wherein one end portion of the diaphragm 4 is fixed and held to an end portion of the inner sleeve 2 through a ring 5 surrounding the inner sleeve 2 and the other end portion thereof is fixed and held to an end portion of the outer sleeve 1 through a ring 6 surrounding the outer sleeve 1. Numeral 7 is a hollow cylindrical body covering all the outside of the diaphragm 4 and suppressing the expansion of the diaphragm 4 when vibration is inputted to the air spring, wherein an end portion of the hollow cylindrical body 7 is fixed and held to an outer surface of the sidewall of the outer sleeve 1.

Figure 2:
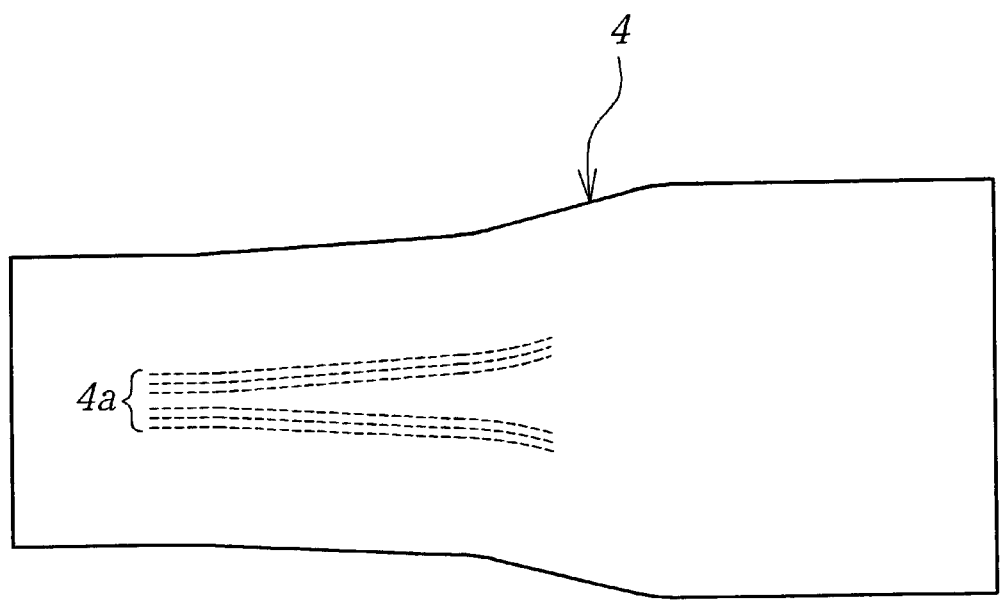

In FIG. 2 is shown the diaphragm 4 before the assembling into the air spring. In the diaphragm 4 are arranged cords 4a of the cord reinforcing layer 4 substantially along the axial direction of the diaphragm 4 as partly shown in FIG. 2.

In the air spring having the above structure, a region defined by the outer sleeve 1, inner sleeve 2 and diaphragm 4 forms an air chamber A, and air is supplied thereinto through the supply and discharge port 1a to obtain an air spring having a desired spring constant. When the inner sleeve 2 moves toward the side of the air chamber A in the air spring or strokes in compression direction (this state is called as bound state), a contact length L between the diaphragm 4 and the inner sleeve 2 becomes longer as the bound stroke amount becomes large, and hence a portion of the diaphragm 4 located at the side of the outer sleeve 1 is pulled toward the inner sleeve 2 to increase the pressure inside the air chamber A and hence the spring constant.

Figure 3:
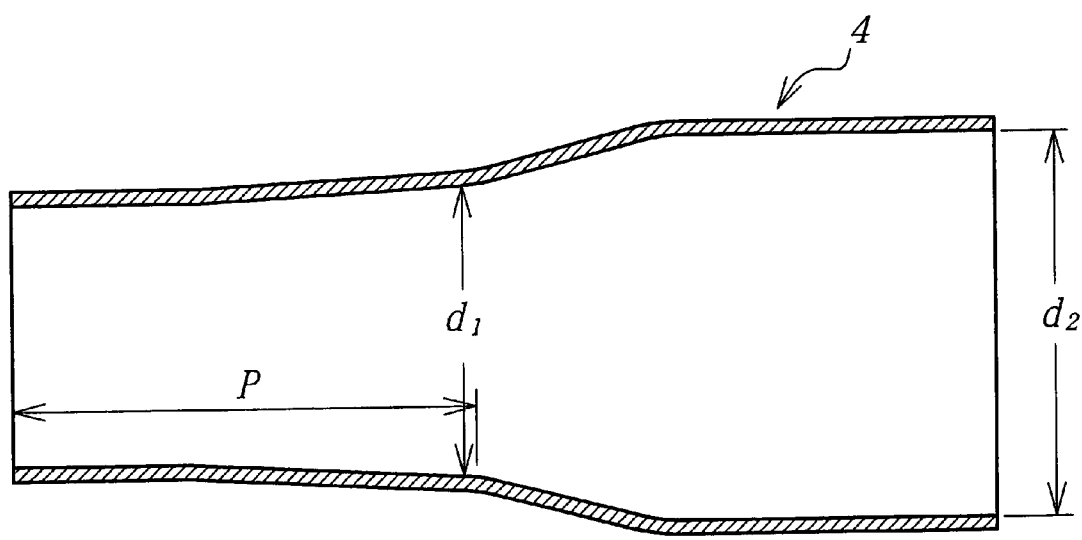
FIG. 3 is a section view of the diaphragm shown in FIG. 2.

On the other hand, when the inner sleeve 2 moves so as to separate away from the air chamber A or strokes in extension direction (this state is called as rebound state), the contact length L between the diaphragm 4 and the inner sleeve 2 becomes shorter as the rebound stroke amount becomes large. At a state that the inner sleeve 2 is nearest to the air chamber A, force in compression direction acts to rubber itself constituting the diaphragm 4 and the folding wrinkle is apt to be created in the diaphragm 4 as previously mentioned. In the diaphragm 4 according to the invention, however, a maximum inner diameter $d_1$ of the diaphragm engaging with at least inner sleeve 2 at a region P as shown in FIG. 3 is made equal to or smaller than a minimum outer diameter D of the inner sleeve 2 as shown in FIG. 1. Therefore, when such a diaphragm 4 is assembled onto the inner sleeve 2 as shown in FIG. 1, tensile force always acts to the region P of the diaphragm 4 in the circumferential direction thereof, which mitigates a force creating the folding wrinkle in the diaphragm 4 even if such a force is created.

In the invention, the region (P in FIG. 3) of the diaphragm 4 engaging with at least inner sleeve 2 is a length maintaining the contact between the diaphragm and the inner sleeve even at the maximum stroke in the bound state of the air spring, which varies in accordance with the size or spring constant of the air spring.

Figure 4:
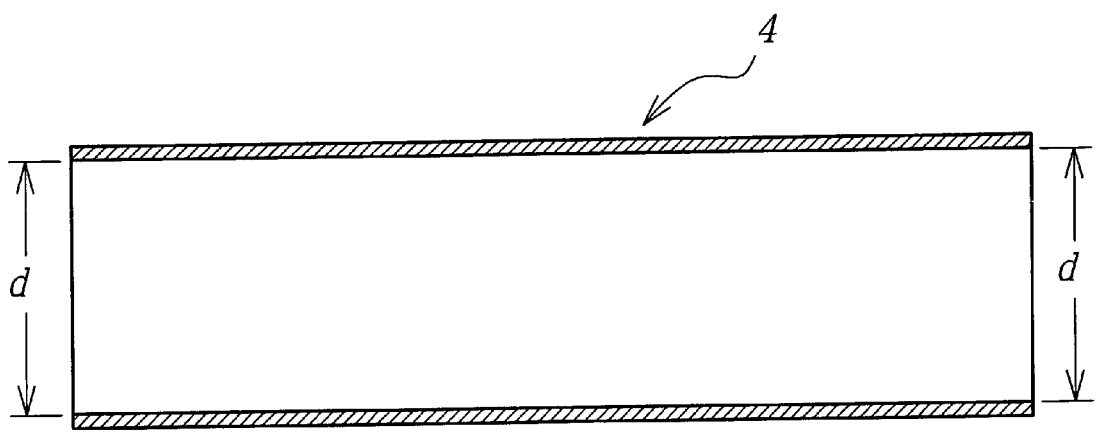
FIG. 4 is a section view of another embodiment of the diaphragm according to the invention.

In FIG. 4 is shown another embodiment of the diaphragm according to the invention before the assembling onto the inner sleeve. In this embodiment, the diaphragm is a cylindrical form having the same inner diameter d over its full length. In such a diaphragm, tensile force in the circumferential direction is always applied to the diaphragm even at any stroke states, so that there is a merit that the diaphragm can be used without changing the shape of the diaphragm even if the specification of the stroke is changed.

Figure 5:
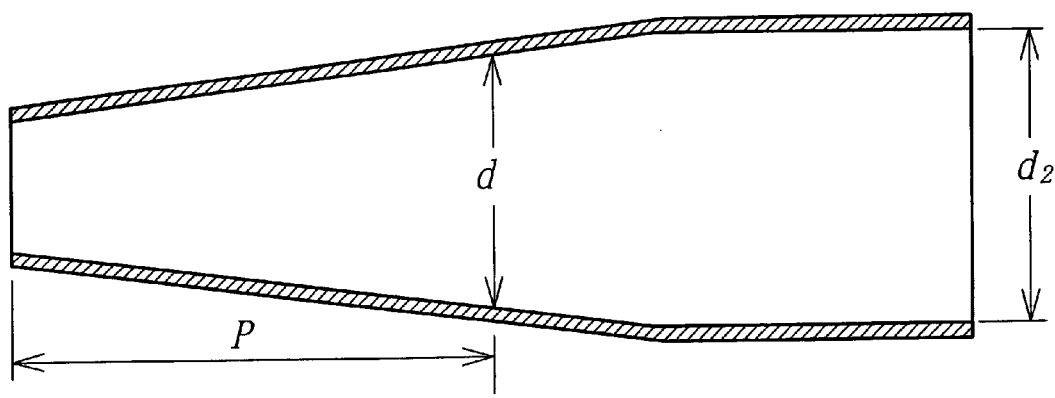
FIG. 5 is a section view of the other embodiment of the diaphragm according to the invention.

In FIG. 5 is shown the other embodiment of the diaphragm according to the invention. In this embodiment, the diaphragm has a tapered form wherein the inner diameter d is made gradually small from a position engaging with the outer sleeve toward a position engaging with the inner sleeve, whereby the form of the diaphragm is simplified. In such a diaphragm, it is required to previously take a specified design on the inner diameter d located at the region P in the maximum stroke at the bound state before the assembling onto the inner sleeve (it is required to set the tapering angle). That is, the assembling can simply be carried out by making a maximum inner diameter $d_2$ of the diaphragm equal to an opening diameter of the outer sleeve (at the position engaging with the diaphragm).

Figure 6A:
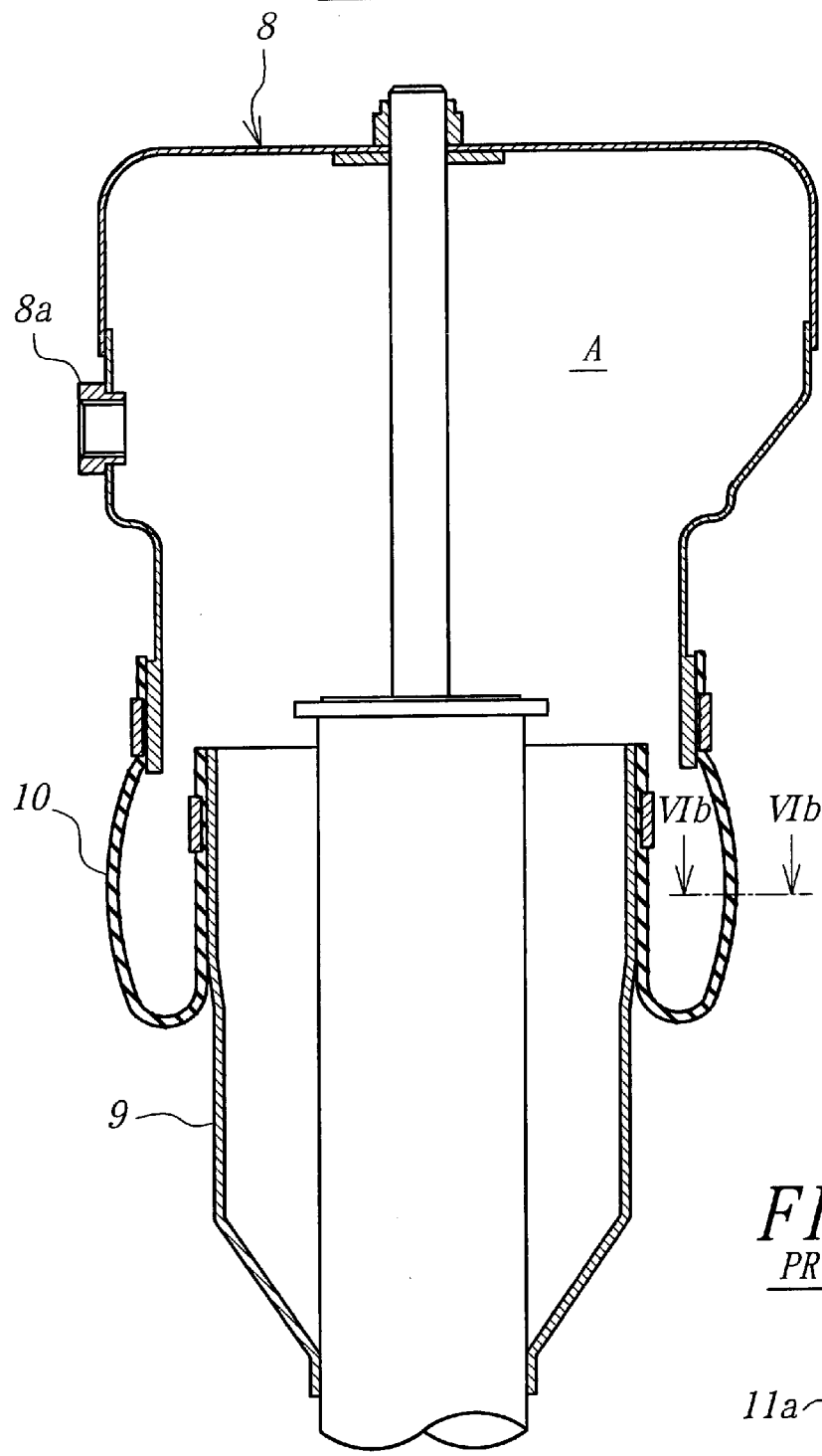
FIG. 6a is a diagrammatically section view of an air spring provided with the conventional diaphragm.
Figure 6B:
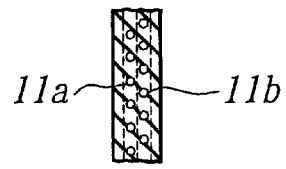
Figure 7A:
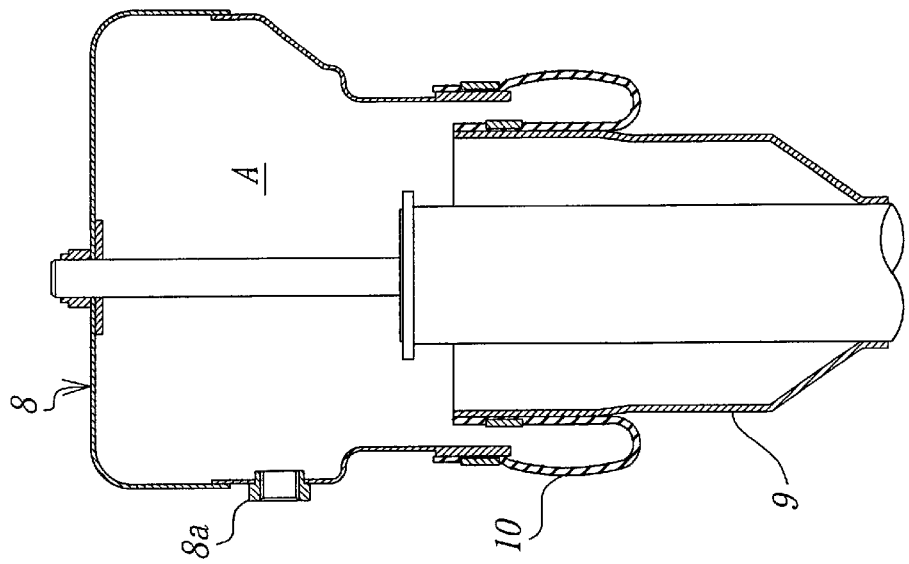
FIGS. 7a and 7b are diagrammatically section views illustrating a working state of the air spring provided with the conventional diaphragm, respectively.
Figure 7B:
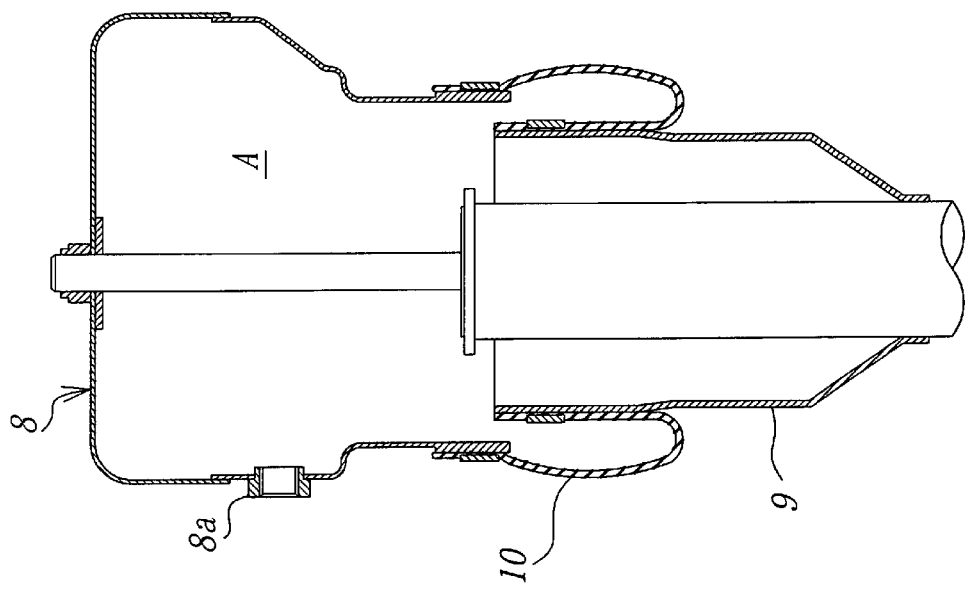
Figure 8:
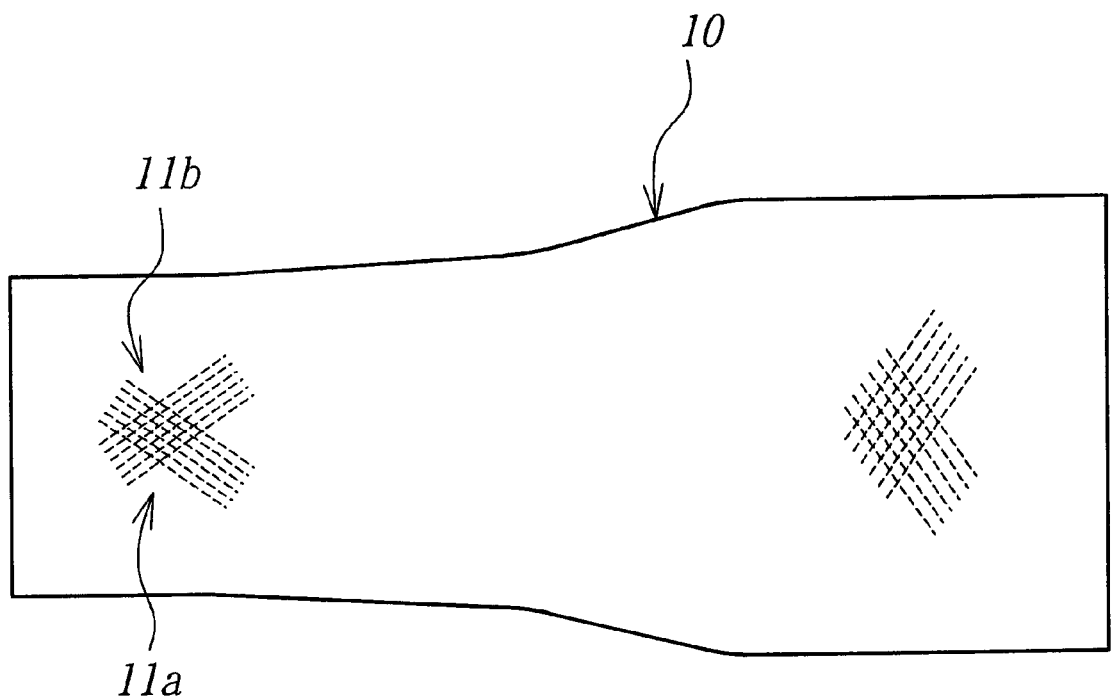
FIG. 8 is a diagrammatically plan view of the conventional diaphragm.

Onto an air spring having the structure shown in FIG. 1 (diameter of inner sleeve: 83 mm) is assembled a diaphragm shown in FIG. 2 (length: 210 mm, $d_1$: 80 mm, $d_2$: 110 mm, nylon cord reinforcing layer). Then, the durability of such a diaphragm is measured by inputting vibrations under conditions that a frequency is 3 Hz, a temperature is 80° C. and an amplitude of vibration applied is ±50 mm. For the comparison, an air spring having the conventional structure as shown in FIG. 6 and assembled with a diaphragm (length: 220 mm, d1: 85 mm, d2: 120 mm, two nylon cord reinforcing layers) is tested to measure the durability of the diaphragm. As a result, the diaphragm in the conventional air spring is degraded up to an unusable state at about 100,000 times, while the diaphragm according to the invention is usable up to about 9,000,000 times. That is, it has been confirmed that the durability of the diaphragm is considerably improved.

According to the invention, the durability of the diaphragm can considerably be prolonged while avoiding the occurrence of folding wrinkle accompanied with the input of vibrations, so that when the diaphragm is used as a constructional element of the air spring, the quality of such an air spring can be held over a long period of time.

What is claimed is:

1. An air spring comprising; an outer sleeve provided with a hollow cylindrical body suppressing an expansion of a diaphragm at a stroke in a compression direction of the air spring and an air supply and discharge port, an inner sleeve fitted into an inside of the outside sleeve and a folded portion of the diaphragm connecting the outer sleeve and the inner sleeve to each other to form an air chamber, therein an inner diameter of the diaphragm prior to assembly at a region engaged with at least an inner sleeve of the air spring is made equal to or smaller than a minimum outer diameter of the inner sleeve so as to exert a tensile force in a circumferential direction of the diaphragm at a state of engaging with the inner sleeve, and wherein the diaphragm is a tapered shape wherein the inner diameter becomes gradually small from a position engaging with the outer sleeve toward a position engaging with the inner sleeve.

2. An air spring according to claim 1, wherein the region of the diaphragm engaging with the inner sleeve is in a region maintaining the contact between the inner sleeve and the folded portion of the diaphragm at a maximum stroke in the compression direction of the air spring.

3. An air spring according to claim 1, wherein the diaphragm is a columnar shape wherein the inner diameter of the diaphragm is equal over its full length.

4. An air spring according to claim 1, wherein the diaphragm is provided with a cord reinforcing layer containing cords substantially arranged along an axial direction of the folded diaphragm.

5. An air spring comprising; an outer sleeve provided with a hollow cylindrical body suppressing an expansion of a diaphragm at a stroke in a compression direction of the air spring and an air supply and discharge port, an inner sleeve fitted into an inside of the outside sleeve and a folded portion of the diaphragm connecting the outer sleeve and the inner sleeve to each other to form an air chamber, therein an inner diameter of the folded diaphragm prior to assembly at a region engaged with at least an inner sleeve of the air spring is made equal to or smaller than a minimum outer diameter of the inner sleeve so as to exert a tensile force in a circumferential direction of the diaphragm at a state of engaging with the inner sleeve, and wherein the diaphragm is provided with a cord reinforcing layer containing cords substantially arranged along an axial direction of the folded diaphragm.

6. An air spring according to claim 5, wherein the region of the diaphragm engaging with the inner sleeve is in a region maintaining the contact between the inner sleeve and the folded portion of the diaphragm at a maximum stroke in the compression direction of the air spring.

7. An air spring according to claim 5, wherein the diaphragm is a columnar shape wherein the inner diameter of the diaphragm is equal over its full length.

* * * * *